(12) United States Patent
Nolemo et al.

(10) Patent No.: US 8,138,702 B2
(45) Date of Patent: Mar. 20, 2012

(54) CONTROL METHOD AND MOTORSTARTER DEVICE

(75) Inventors: Jan-Anders Nolemo, Västerås (SE); Magnus Ek, Västerås (SE); Heinz Lendenmann, Västerås (SE); Jesper Kristensson, Västerås (SE)

(73) Assignee: Abb Research Ltd., Zürich (CH)

( * ) Notice: Subject to any disclaimer, the term of this patent is extended or adjusted under 35 U.S.C. 154(b) by 395 days.

(21) Appl. No.: 12/446,265

(22) PCT Filed: Oct. 18, 2007

(86) PCT No.: PCT/EP2007/061154
§ 371 (c)(1),
(2), (4) Date: Apr. 20, 2009

(87) PCT Pub. No.: WO2008/046885
PCT Pub. Date: Apr. 24, 2008

(65) Prior Publication Data
US 2010/0327790 A1 Dec. 30, 2010

Related U.S. Application Data

(60) Provisional application No. 60/853,025, filed on Oct. 20, 2006.

(30) Foreign Application Priority Data

Oct. 20, 2006 (EP) .................................. 06122689

(51) Int. Cl.
H02P 1/04 (2006.01)
H02P 7/00 (2006.01)

(52) U.S. Cl. ......... 318/430; 318/432; 318/434; 318/778

(58) Field of Classification Search .................. 318/430, 318/432, 434, 474, 778, 802, 807
See application file for complete search history.

(56) References Cited

U.S. PATENT DOCUMENTS
4,707,650 A 11/1987 Bose
(Continued)

FOREIGN PATENT DOCUMENTS
EP 0 741 448 A1 11/1996
(Continued)

OTHER PUBLICATIONS

International Search Report, dated Jun. 23, 2009, issued in connection with Counterpart Application No. PCT/EP2007/061154.
(Continued)

Primary Examiner — Thomas Dougherty
(74) Attorney, Agent, or Firm — Venable LLP; Eric J. Franklin

(57) ABSTRACT

A method for controlling an electric motor with a softstarter. A softstarter device for control of electric motors. Motor torque is controlled in dependence of a torque error signal, based on a calculated difference between the motor torque and a reference torque value, so that the motor torque displays a rate of change with respect to time, during a stopping or starting time interval, that is adapted to follow a rate of change of the reference torque value, with respect to time, that varies between at least a first part of the time interval and a second part of the time interval, and thereby changing the speed of the motor. A system includes an electric motor, a device driven by the electric motor and a softstarter device for controlling the electric motor. A computer program product includes a computer readable medium and a computer program recorded thereon.

20 Claims, 7 Drawing Sheets

U.S. PATENT DOCUMENTS

| | | | |
|---|---|---|---|
| 5,008,608 A * | 4/1991 | Unsworth et al. | 318/729 |
| 5,825,154 A | 10/1998 | Runggaldier et al. | |
| 5,859,514 A * | 1/1999 | Chouffier et al. | 318/432 |
| 6,510,923 B1 | 1/2003 | Veletovac et al. | |
| 6,667,596 B1 | 12/2003 | Griepentrog et al. | |
| 6,721,620 B2 | 4/2004 | Jelali et al. | |
| 6,781,342 B2 * | 8/2004 | Tolbert et al. | 318/784 |
| 6,788,024 B2 * | 9/2004 | Kaneko et al. | 318/807 |
| 7,193,387 B1 * | 3/2007 | Lu et al. | 318/800 |
| 2004/0173414 A1 | 9/2004 | Deplazes et al. | |
| 2004/0189243 A1 * | 9/2004 | Tobari et al. | 318/807 |
| 2007/0013326 A1 * | 1/2007 | Kling et al. | 318/66 |
| 2007/0090783 A1 | 4/2007 | Rainer et al. | |
| 2009/0140674 A1 * | 6/2009 | Nakatsugawa et al. | 318/400.02 |

FOREIGN PATENT DOCUMENTS

| | | |
|---|---|---|
| EP | 1 914 875 A1 | 4/2008 |
| WO | WO 95/20839 | 8/1995 |
| WO | WO 00/46138 | 8/2000 |
| WO | WO 02/41485 A1 | 5/2002 |
| WO | WO 03/008316 A1 | 1/2003 |
| WO | WO/2004/079890 * | 9/2004 |
| WO | WO 2005/048446 A1 | 5/2005 |

OTHER PUBLICATIONS

Written Opinion of the International Searching Authority, dated Jun. 23, 2009, issued in connection with Counterpart Application No. PCT/EP2007/061154.

Supplemental European Search Report—Jul. 9, 2009.

* cited by examiner

CONTROL METHOD AND MOTORSTARTER DEVICE

CROSS-REFERENCE TO RELACTED APPLICATIONS

This application claims priority to U.S. provisional patent application 60/853,025 filed 20 Oct. 2006 and European patent application 06122689.0 filed 20 Oct. 2006 and is the national phase under 35 U.S.C. §371 of PCT/EP2007/061154 filed 18 Oct. 2007.

TECHNICAL FIELD

The present invention is concerned with a method for controlling an electric motor by means of a softstarter.

The present invention is also concerned with a softstarter device for control of electric motors.

Furthermore, the present invention is related to a system comprising an electric motor, a device driven by the electric motor and a softstarter device for controlling the electric motor; a computer program and a computer readable medium having a computer program recorded thereon.

BACKGROUND ART

Many electric motors used in industrial and commercial processes and buildings are controlled by softstarter equipment.

A softstarter device is in this case a motor controller adapted for controlling a motor during the start-up phase and stopping phase of the operation of the motor. The softstarter device is used to start and stop the motor in a desired manner, such as to eliminate electrical surges in the electrical supply and/or overheating in the motor. Softstarters are also used to reduce or eliminate mechanical shocks or vibration which might otherwise occur under start/stop conditions causing wear and damage to the pumps, fans etc. driven by the motors. A softstarter device typically measures the input current and/or voltage of the motor and regulates the input current and/or voltage received by the motor to achieve a desired start or stop performance. The soft-starter usually comprises semi-conductor switches or the like and logic units to control the switches. A softstarter device is sometimes also called a transient control starter.

The softstarter device generally requires configuration to suit the circumstances of each application. The parameter configuration of the softstarter device may be grouped as motor-data, describing the present motor and the start-stop parameters describing the start and stop process. During configuration the parameters influencing in particular the starting current, and also factors such as the speed, start up time or maximum input current etc. have to be selected or set up in the softstarter device according to what kind of start or stop is desired for the motor and/or the equipment it is driving. Softstarters may comprise many features and functions and the configuration is often therefore somewhat difficult and time consuming.

A softstarter device normally uses a reduced-voltage stopping technique ensuring a continuous voltage decrease supplied to the motor during the stopping phase of the motor instead of switching off the voltage supply directly. This is used to control the performance of the motor during the stopping phase. As the torque is reduced, the speed of the load will reduce to the point where the load torque equals the shaft torque.

During start and stop of motors used as pumps for pumping water in pipe-systems problems due to mechanical stress are common. These problems include drive belt slippage, wear on gear boxes and so on. A well known problem due to mechanical stress is the occurrence of high-pressure water shocks in the pipes. The phenomenon is also called water hammering. Water hammering occurs when the water flow is shut off suddenly which sends a pressure or shock wave down the water line through the water shocking the pipe system and creating the hammering noise. The involved forces may be high and the stress on the pipe-system may therefore be great causing damages to the pipe-system. The consequence is higher maintenance costs and also a shortening of the lifetime on the pipe-system.

To solve this problem conventional softstarters use voltage control to limit the motor input current and torque. Typically, the voltage supplied to the motor in this solution is a linear voltage ramp. The voltage is continuously decreased during the stopping process. However due to the dynamic characteristics of a water system and the non-linear characteristics of the motor this does not put a stop to the water hammering in the pump system.

Therefore many softstarters of today comprise a voltage step down to limit the voltage in the beginning of the stop ramp. The drawbacks of this solution are that it is difficult to set up the configuration parameters for all situations. To use a static setting to control a dynamic system is not efficient, because, when the system changes such as the water level or the pressure of the water, or otherwise operating the pumps the configuration settings are no longer accurate and will not prevent the water hammering.

Examples of softstarters for controlling acceleration (start-up) and/or deceleration (stopping or run down) illustrating the above can be found in U.S. Pat. Nos. 5,859,514, 6,667,596 and 4,707,650. U.S. Pat. No. 5,859,514 is related to a start-up process and U.S. Pat. No. 6,667,596 is related to a run down process.

SUMMARY OF THE INVENTION

The aim of the invention is to provide a softstarter device adapted to stop or start a motor in a system in a desired manner without causing stress in or damage to the system.

In a first aspect of the invention this aim is obtained by a method.

Such a method for controlling an electric motor by means of a softstarter device comprises:

determining an electromagnetic torque of said motor in motion, calculating a difference between said determined electromagnetic motor torque and a reference torque value for said electromagnetic torque, calculating a torque error signal from the calculated difference between said determined motor torque and the reference torque value to change the speed of said motor, controlling the motor torque in dependence of said torque error signal, so that the motor torque displays a rate of change with respect to time during a stopping or starting time interval, that is adapted to follow a rate of change of the reference torque value with respect to time, that varies between at least a first part of the time interval and a second part of the time interval, and thereby changing the speed of said motor, calculating the rate of change of the motor torque based on measurement of the input voltage (u) supplied to the motor (1,20,50), and taking the measurement of the input voltage (u) supplied to the electric motor (1,20,50) from an inline position before the softstarter device (2,24,54).

The invention makes it possible to shape a desired stop ramp, or alternatively start-up ramp as the case may be, based on torque control and adapted to the circumstances of each application. Further the invention makes it easier to adjust the torque output from the softstarter device to the presently required motor torque, so that the softstarter device never looses control of the motor due to unpredictable electrical disturbances in the signal supplied to the motor. This is also an advantage because mechanical stress due to water hammering, gear cogging and slipping belts is avoided if the softstarter device adjusts the output torque to the required motor torque, i.e. the reference torque. This invention also makes the stopping or start-up process of the motor more reliable, and therefore it is easier to stop or start the motor. This is an advantage because it is possible to reduce the speed so that in particular the stopping process is soft without the occurrence of electrical disturbances like surges. This makes it easier to stop the motor when it is not needed instead of letting the motor run on a low speed to avoid electrical disturbances which is often done using prior art softstarters. The outcome is that less maintenance is needed, because the motor will be exposed to fewer shocks that might damage the motor.

Furthermore, according to a further feature above, the rate of change of the motor torque is calculated based on the measured voltage supplied to the motor. As the current supplied to the motor is also measured this makes it possible to calculate the power supplied to the motor. From this supplied power the motor power losses are subtracted and the real power to the motor is calculated. From the power calculations the torque supplied to the motor can be determined. A reference torque $T_m$ value is obtained from a torque T set-point ramp using a load model for the device driven for the motor, for instance, a quadratic load representing a pump. The supplied torque from the motor is then compared to the desired torque, i.e. the reference torque, during start and stop of the motor. This is an advantage because using the measured voltage to calculate the power supplied to the motor results in an accurate analysis of the power presently consumed of the motor and of the present shaft torque. Further this makes it possible for the softstarter device to maintain a constant accelerating and decelerating torque during start and stop.

According to a further feature above, the measurement of the voltage supplied to the motor is from an inline position before the softstarter device. This has the advantage that both inline connected and inside-delta connected motors can be controlled during start and stop.

According to an embodiment of the invention, the method comprises controlling the rate of change of the motor torque in the first part of the stopping/starting time interval to be less than in the second part of the stopping time interval. This is an advantage because in the beginning of, for example, a stopping process the kinetic energy of the motor and, for instance when the motor controls a pump, the flow of fluid in is greater than during the end of the process. Thus in a pipe-system comprising a fluid the water-flow is at maximum in the beginning of the stopping process and if the torque stop ramp reduces the flow in the water system very slowly in the beginning and then gradually increases the deceleration the water hammer in the system is prevented.

In an alternative embodiment of the stop ramp the absolute value of the derivate in any point of the reference ramp is gradually increasing. This embodiment is especially advantageous when a softstarter device is driving a pump with the following characteristic: The flow in the pump system is proportional to the square of the speed of the motor.

According to an embodiment of the invention, the method comprises controlling the rate of change of the motor torque so that it is greater at the end (tN) of the stopping/starting time interval (t1–tN) than at the beginning (t1) of the stopping/starting time interval. This is advantageous because the speed of the motor and thereby the flow increases in the end of the ramp, the larger flow cleans the pump or the pipe system comprising the pump.

According to an embodiment of the invention, the method comprises controlling the rate of change of the motor torque so that it is less at the end (tN) of the stopping/starting time interval (t1–tN) and at the beginning (t1) of the stopping/starting time interval in comparison to the middle part of the stopping/starting time interval. This is an advantage because the stopping or starting process is most critical at the end and in the beginning of the process.

According to an embodiment of the invention, the method comprises controlling the rate of change of the motor torque so that it is linear during a part of the stopping/starting time interval. This is an advantage because this makes it possible to have a fast deceleration of the motor during this part of the stopping time interval, which shortens the total stopping time interval which usually is a desired function of the motor. The corresponding situation applies to the start-up process.

According to an embodiment of the invention power losses of the motor are calculated based on the nominal current for the motor. This improves the ease of use when setting up the softstarter, for instance, driving an advanced pump stop, only one motor parameter is requested from the user. This as opposed to known devices where up to 5 motor parameters may be requested before the user can start and stop using torque control.

The only motor parameter required is the nominal current of the motor. With this parameter the power loss in the motor is calculated from a relationship between nominal current and stator resistance. During a stopping phase the starting point for the control algorithm is the present torque calculated from measurement of the present voltage. With this the control parameters can be dimensioned for each size of motor. None of the: number of poles; nominal motor speed; nominal motor voltage; nominal motor power; nominal motor cosϕ or nominal frequency are needed as information from the user to set up a start and stop ramp with torque control for the motor according to the invention. According to another embodiment of the invention, the input voltage measurement is made from a position inside an inside-delta connection to the motor. This has the advantage that inside-delta connected motors can be controlled during start and stop. No settings on the softstarter device have to be configured concerning which connection the presently controlled motor has.

According to another embodiment of the invention the measurement of the input voltage supplied to the motor is also made at a point between the motor and the softstarter device. This is an advantage when inline connected motors are controlled during start and stop.

According to an embodiment of the invention, the input voltage (u) is measured in at least one phase.

In a second aspect of the invention this aim is obtained by a softstarter device.

Such a softstarter device is adapted for controlling an electric motor connected to the device. The softstarter device comprises determining means for determining an electromagnetic torque of the motor, calculating means for calculating a difference between the determined electromagnetic motor torque and a reference torque value for said electromagnetic torque, and means for calculating an error signal from the difference between said determined motor torque and the reference torque value to change the speed of said motor. The softstarter device also comprises regulation means for controlling the motor torque in dependence of said torque error signal so that the motor torque displays a rate of change with respect to time, during a stopping or starting time interval, that is adapted to follow a rate of change of the reference torque value with respect to time, that varies between at least a first part of the time interval and a second part of the time interval, and thereby changing the speed of said motor. The softstarter device also comprises means for measuring the input voltage supplied to the motor, and that the means for measuring the input voltage (u) is arranged to measure the voltage at a point before the softstarter device and the motor, and that the determining means for determining the electromagnetic torque ($T_{12}$) of the motor are arranged to use said input voltage.

According to an embodiment of the invention the softstarter device comprises means for measuring voltage supplied to the motor. In an embodiment of the invention the means for measuring voltage is arranged for measuring a voltage in at least one phase.

Further advantages and advantageous features of the embodiments of the softstarter device correspond to the advantages and advantageous features of the corresponding method. In particular, in one embodiment, the input voltage measurement means is arranged to measure the input voltage (u) from an inside position arranged in an inside-delta connection to the motor.

In a third aspect of the invention this aim is obtained by a system comprising an electric motor and a device driven by the motor and a softstarter device for controlling the electric motor. In one embodiment the electric motor and the softstarter device has an inside-delta connection to the supplied voltage (u).

The method and system are facilitated by one or more computer programs comprised in the softstarter/motor controller.

The invention also relates to a computer program as well as a computer readable medium. The steps of the method according to the invention are well suited to be controlled by a processor provided with such a computer program.

Other advantageous features and advantages of the invention will appear from the following description.

The method and device according to this invention may be applied to a wide range of motors, such as asynchronous motors, induction motors etc. In fact it can be applied to almost any AC motor application. In addition to pumping systems, it may be used in motors in connection with bow thrusters on ships, in compressors for example in fillings stations for natural gas or snow making machines, common industrial applications such as fans, compressors and conveyor belts, etc.

BRIEF DESCRIPTION OF THE DRAWINGS

The present invention will be described in more detail in connection with the enclosed schematic drawings.

DESCRIPTION OF EMBODIMENTS

The AC supply frequency to the motor may be either 50 Hz or 60 Hz and the range of operating currents and operating voltages supplied to the motor is extensive. In a system comprising a motor arranged with a softstarter device the angular speed of the motor is generally determined by the supplied frequency and the number of motor poles. It is to be understood that also other frequencies can be used.

Figure 1A:
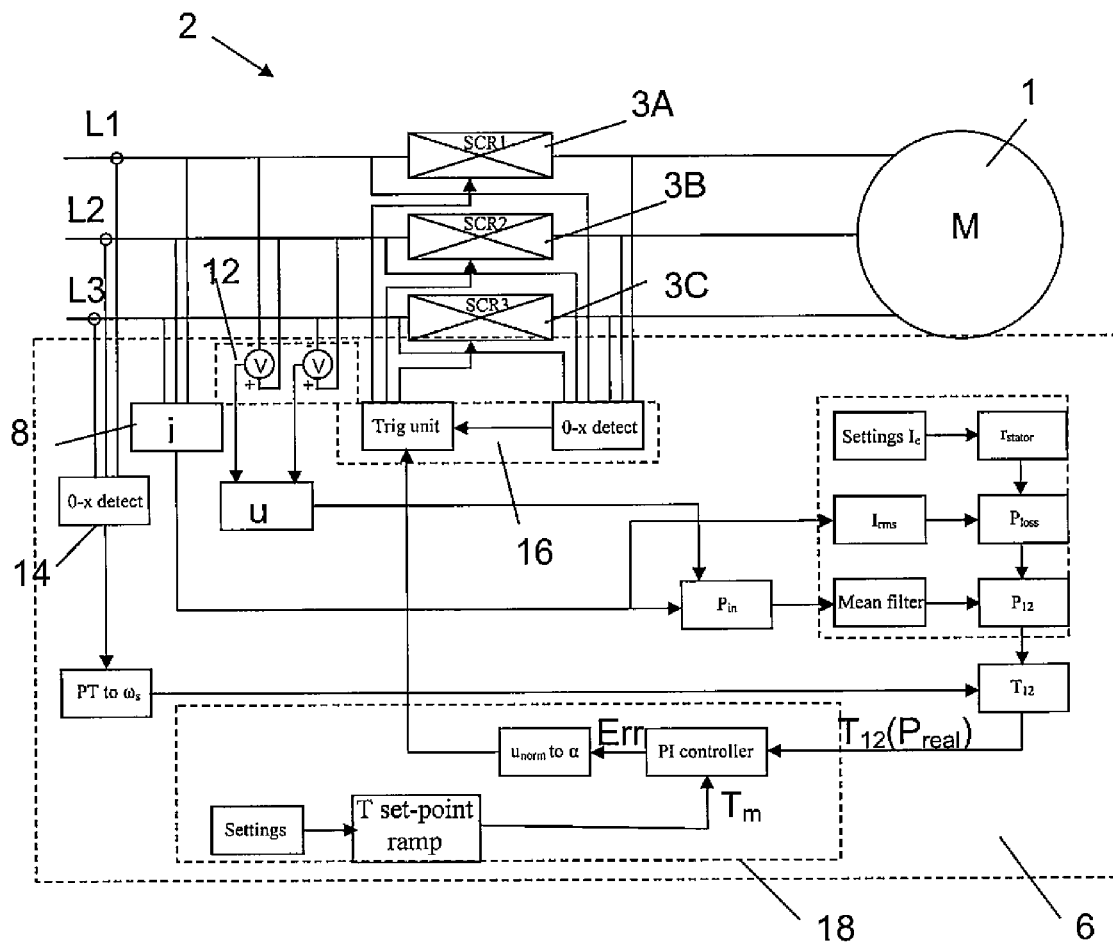
FIG. 1a shows schematically an overview of a system comprising a soft-starter according to an embodiment of the invention.

FIG. 1a shows a system comprising an electric motor 1, a softstarter device 2 for controlling the current supplied to the motor and an apparatus such as a pump, not shown in the figure, driven by the motor 2. The motor is in this case an alternating current (AC) three-phase electric motor 1, such as an induction motor. The softstarter device 2 controls the current flow and the voltage applied to the motor. The softstarter device 2 shown in FIG. 1a is connected in series with the voltage supplied to the motor 1. The current supplied to the softstarter device 2 is therefore equal to the current supplied to the motor.

The softstarter device 2 in this example case controls the current in all three phases, reducing current and torque. The softstarter device 2 comprises a switch 3A, 3B, 3C for each phase and a control unit 6 controlling the switches 3A, 3B, 3C and thereby the current by means of regulating the voltage supplied to the motor. Each switch may comprise semi-conductor components, for instance, two semi-conductor diodes in anti-parallel coupling. In the figure, the switches are illustrated as SCR switches (Silicon Control Rectifier switches; thyristors), but also other types of switches may be possible.

Figure 1B:
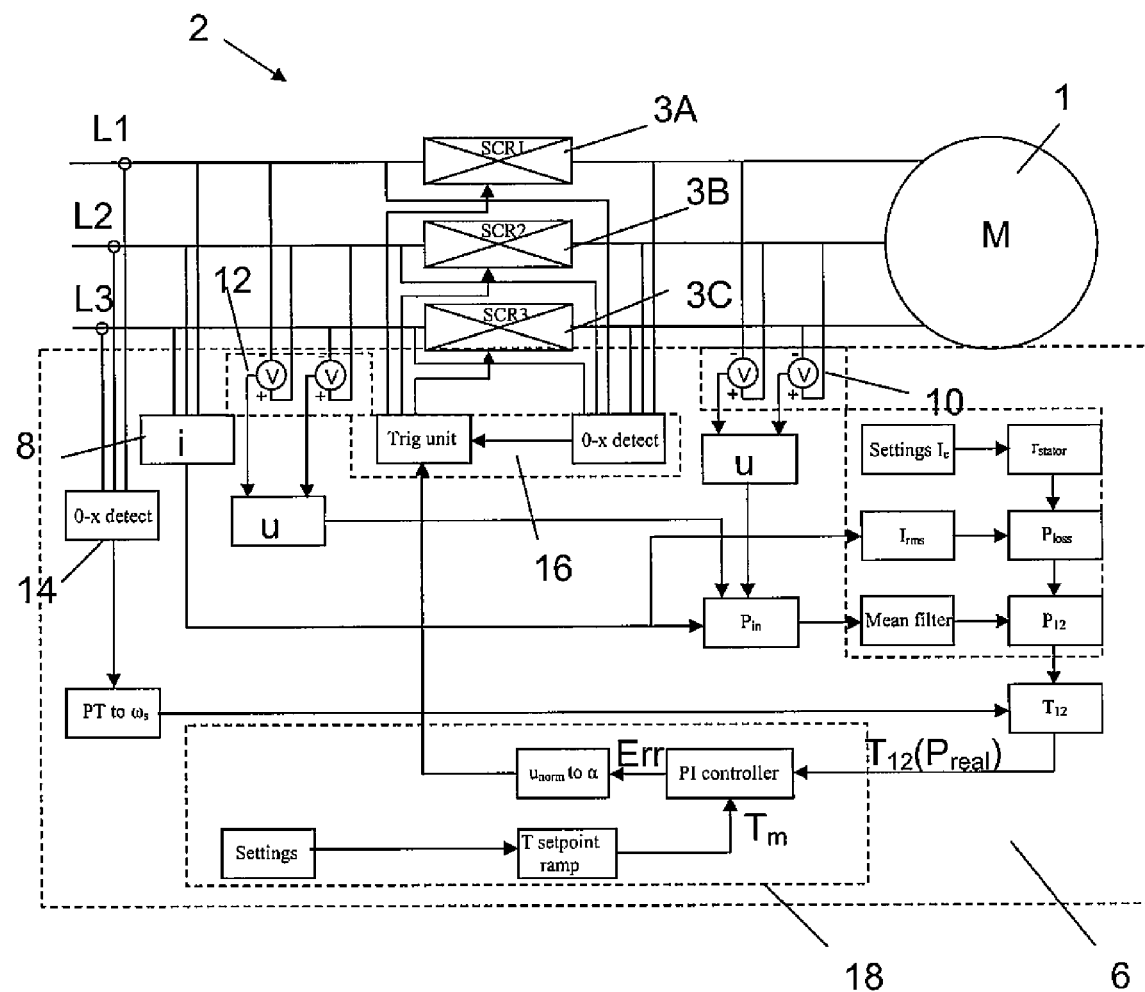
FIG. 1b shows schematically an embodiment that is a variant of the system illustrated in FIG. 1a, FIG. 2a shows schematically an overview of another system comprising a soft-starter according to an embodiment of the invention.

The control unit 6 comprises a current sensor 8 adapted to measuring the input current (i) to the motor 1 in each phase. The control unit also comprises means for measuring voltage, in this case voltage sensors. A first voltage sensor 12 is connected before the semi-conductor devices, which first voltage sensor 12 is adapted to measuring the line voltage supplied to the softstarter. The control unit further comprises phase detection units 14,16. The detection units 14,16 are adapted to measure the phase difference between the input voltage (u) and the input current (i). In another solution of voltage measuring in this embodiment, illustrated in FIG. 1b as a variant, the control unit further comprises a second input voltage sensor 10, adapted to measuring the input voltages of the motor 1. The measured input voltage (u) is in this case the line voltage. The input voltage (u) is measured between the motor 1 and the softstarter 2.

The control unit comprises a feedback regulator loop 18 adapted to control the current by means of regulating the voltage supplied to the motor. The feedback regulator loop is a proportional-integrating feedback loop (PI-regulator). The only motor characteristic that is needed to input to the softstarter device 2 during set up is the nominal input current ($i_{nom}$). Both the voltage and current are measured to calculate the power. In the regulator loop the supplied power $P_{in}$ is calculated in dependence of the input voltage (u) and the input current (i). The motor power losses $P_{12}$ are also calculated in dependence of the nominal input current. The motor power losses are subtracted from the supplied power $P_{in}$ and real power $P_{real}$ to the motor 1 is calculated. The torque $T_{12}$ of the motor 1 is then determined by using the real power $P_{real}$ output of the softstarter. The torque $T_{12}$ of the motor 1 is in this case proportional to the real power $P_{real}$ supplied to the motor. The torque feedback regulator loop 18 is used to provide better control over the deceleration and acceleration of the motor. In the regulation loop a difference between said determined electromagnetic torque $T_{12}$ and a reference value $T_m$ for said electromagnetic torque is calculated. An error signal Err is then calculated dependent on the comparison between said calculated torque and the reference value. The speed of said motor is controlled in dependence of said torque error signal so that the rate of change of motor torque with respect to time during a stopping time interval varies between at least a first part of the time interval and a second part of the time interval. The reference torque $T_m$ value is obtained from a torque T set-point ramp determined from a load model based on experience, e.g. for quadratic loads such as pumps. The T set-point ramp is based on input settings related to start and stop time and rated current $I_e$, and voltage measured in 12, when the device is turned on.

When starting a motor, the softstarter device 2 has a target torque which may be equal to be at least the nominal input current multiplied by the voltage as measured. This has the effect of a torque target that is probably in excess of the torque that the motor 1 plus load attains. The rate of increase of torque is substantially linear and preferably an even, steady increase in torque. The use of a torque target and torque control instead of the voltage targets of prior art softstarters makes the acceleration smoother and more even.

Figure 2A:
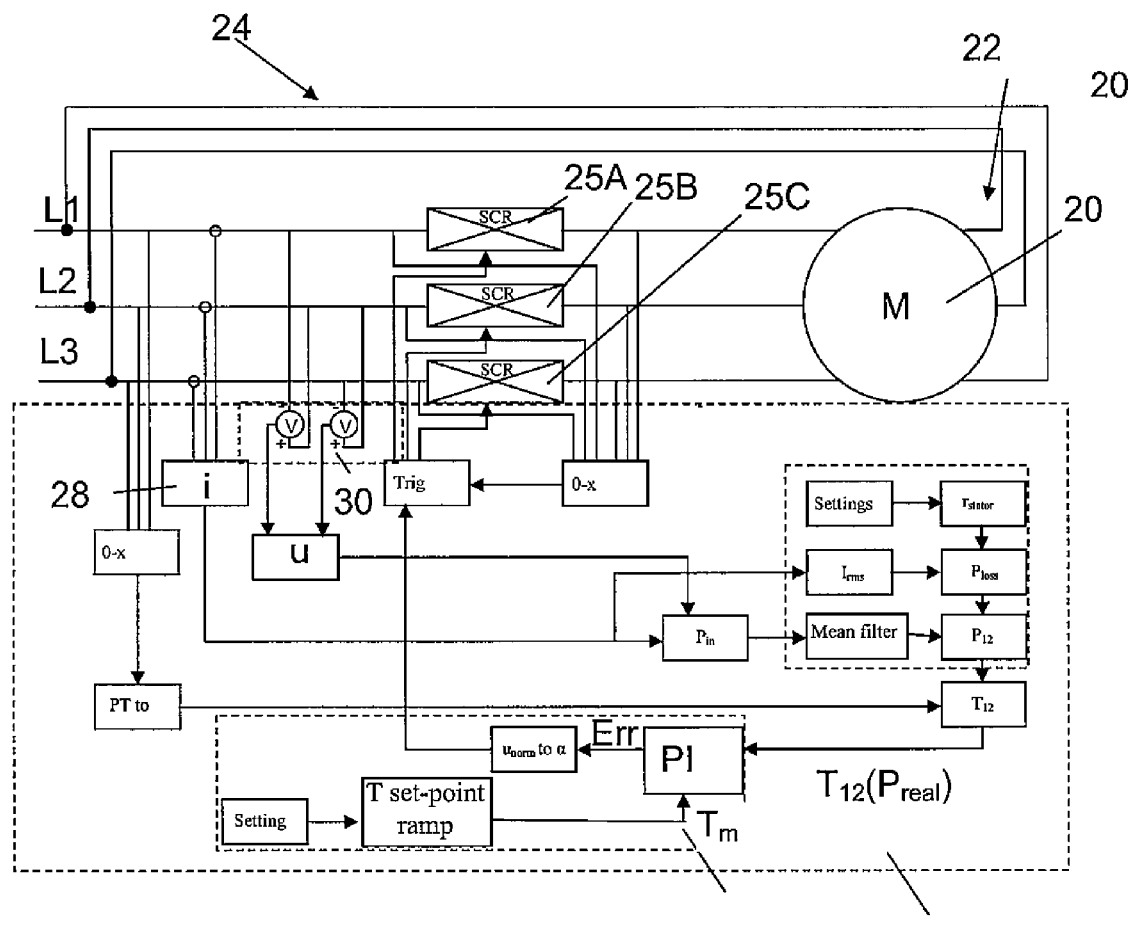
FIG. 2b shows schematically an embodiment that is a variant of the system illustrated in FIG. 2a, FIG. 3 shows schematically an overview of another system comprising a soft-starter according to an embodiment of the invention.
Figure 2B:
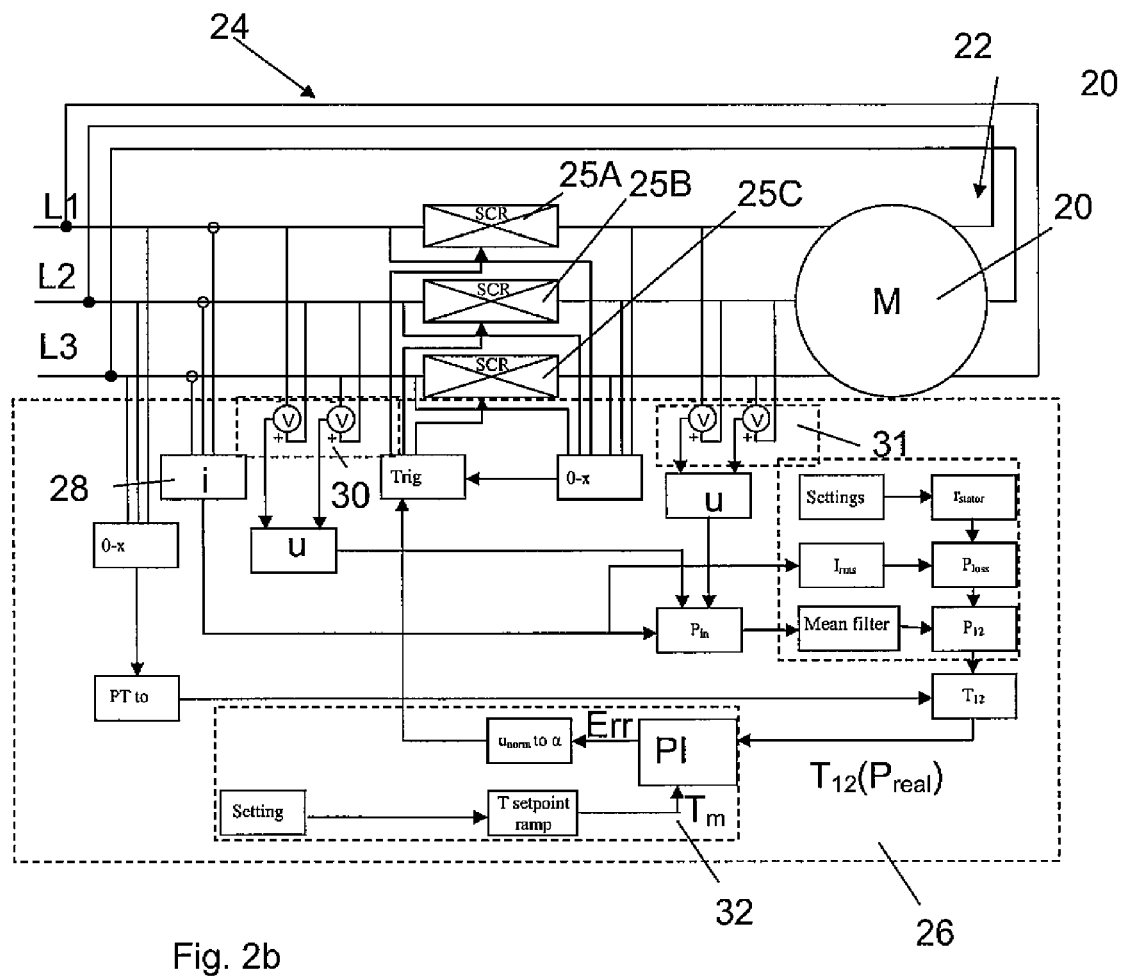

In FIG. 2a, another embodiment of a system is illustrated. In this embodiment torque and rotational speed can be calculated using the input current (i) and input voltage (u), by means of predetermined motor characteristics. The motor 20 has an inside-delta connection 22 to the supplied voltage. The softstarter device 24 controls the voltage applied to the motor. The softstarter device 24 comprises a switch 25A, 25B, 25C, e.g. SCR switch, for each phase and a control unit 6 controlling the switches 25A, 25B, 25C and thereby the current by means of regulating the voltage supplied to the motor. The control unit 26 comprises a current sensor 28 measuring the input current (i) to the motor 20 in each phase. In this embodiment the softstarter device 24 is connected inside the delta of an inside-delta connected motor 20 and the motor torque is controlled in the feedback loop of the regulator. The control unit 26 further comprises means for measuring voltage, in this case voltage sensors. A first input voltage sensor 30, measuring the phase input voltages of the motor 20, inside the delta before the softstarter device 24. In another solution of voltage measuring in this embodiment, illustrated in FIG. 2b as a variant, the control unit 26 further comprise a second input voltage sensor 31, adapted to measuring the input voltages of the motor 20 between the softstarter device 24 and the motor. The input voltage measurement is made from an inline position adapted to the inside-delta connection to the motor. The input current of the motor 20 is measured. The control unit 26 comprises a feedback regulator loop 32 adapted to regulate the current supplied to the motor. The feedback regulator loop is a proportional-integrating feedback loop (PI-regulator) of the same type as described in the embodiment above. The motor power losses $P_{12}$ are calculated in dependence of the nominal input current. The torque $T_{12}$ of the motor is then determined by using the real power $P_{real}$ output of the softstarter.

Since there exists several different types of inside-delta connections, the softstarter may also include a means for identifying the type of inside-delta connection that is used for the concerned motor. Already today most softstarters include some means for this, and such known means may also be used in the present case.

The only motor parameter needed for configuration of the softstarter device 24 is the nominal current of the motor. With this parameter the power losses $P_{12}$ in the motor 20 are calculated from the relationship between nominal current and stator resistance.

In both described embodiments the power of the control algorithm on different sizes of motor can be decided from the nominal torque. Nominal torque is calculated using nominal current, given by user, and voltage measured on incoming main voltage on the softstarter. With this the control parameters can be dimensioned for each size of motor. The feedback regulator loop 14, 32 is for instance embodied as software processed by a logic unit or with electronic components for calculating the output current in dependence of the present power supply needed to the motor.

In another embodiment the softstarter device 24 may also comprise sensor means for measuring rotational speed and sometimes even the output torque.

Figure 3:
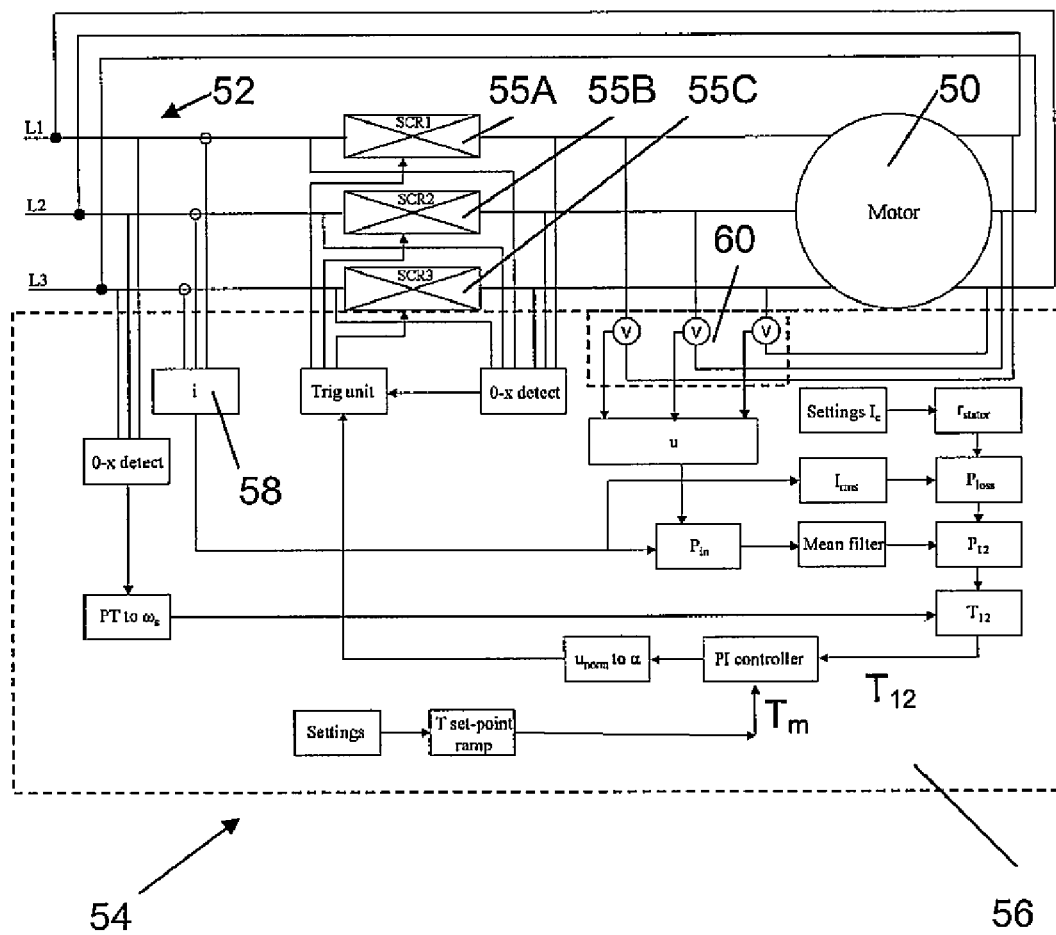

In FIG. 3 another embodiment of a system is illustrated. In this embodiment torque and rotational speed can be calculated using the input current (i) and input voltage (u), by means of predetermined motor characteristics. The motor 50 has an inside-delta connection 52 to the supplied voltage. The softstarter device 54 controls the voltage applied to the motor 50. The softstarter device 54 comprises a switch 55A, 55B, 55C, e.g. SCR switch, for each phase and a control unit 56 controlling the switches 55A, 55B, 55C and thereby the current by means of regulating the voltage supplied to the motor. The control unit 56 comprises a current sensor 58 measuring the input current (i) to the motor 50 in each phase. In this embodiment the softstarter device 54 is also connected inside the delta of an inside-delta connected motor 50 and the motor torque is controlled in the feedback loop of the regulator. The control unit 56 further comprises means for measuring voltage, in this case voltage sensors. An input first voltage sensor 60 is measuring the phase input voltages of the motor 50, inside the delta between the softstarter device 54 and the motor. The input voltage measurement is made from an inline position adapted to the inside-delta connection to the motor. Both the input current of the motor 50 and the output current of the motor 50 are measured. The control unit 56 also comprises a feedback regulator loop 62 adapted to regulate the voltage supplied to the motor 50 as described in the embodiment above by calculating the real power $P_{real}$ output of the softstarter. The torque $T_{12}$ of the motor 50 is determined by using the real power $P_{real}$ output of the softstarter.

Figure 4A:
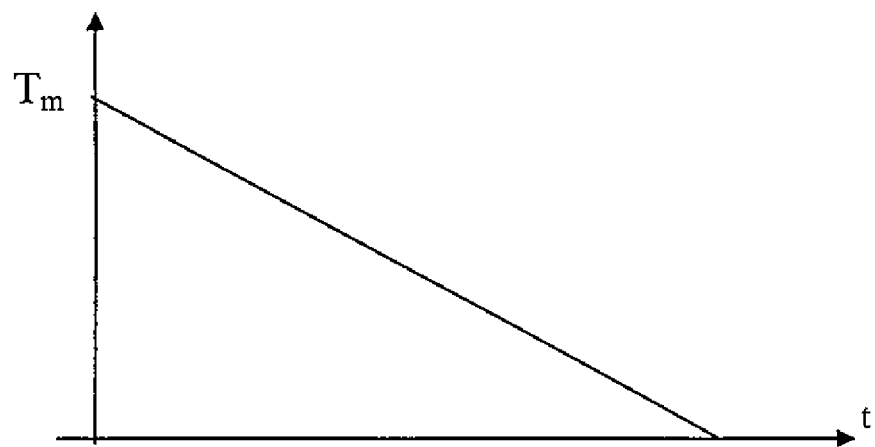
FIG. 4A shows a simplified torque curve according to prior art.
Figure 4B:
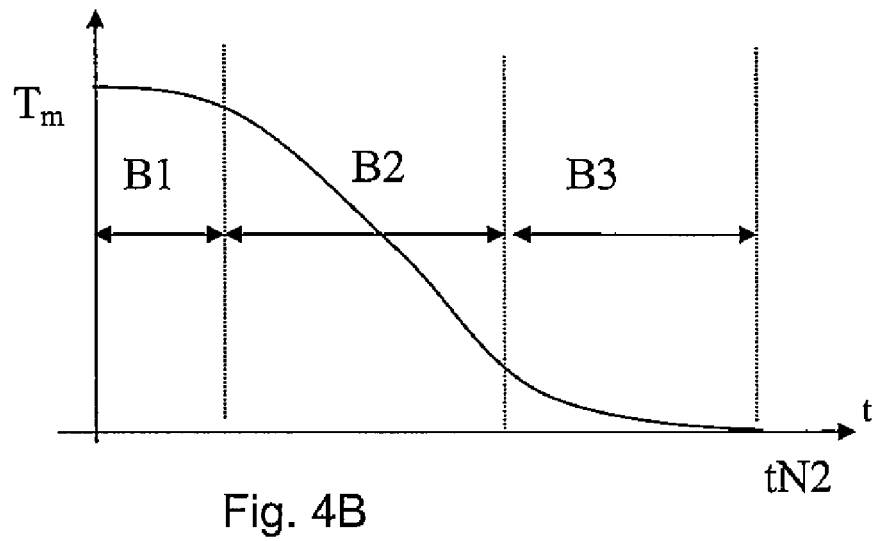
FIG. 4B shows a simplified torque curve according to an embodiment of the invention.
Figure 4C:
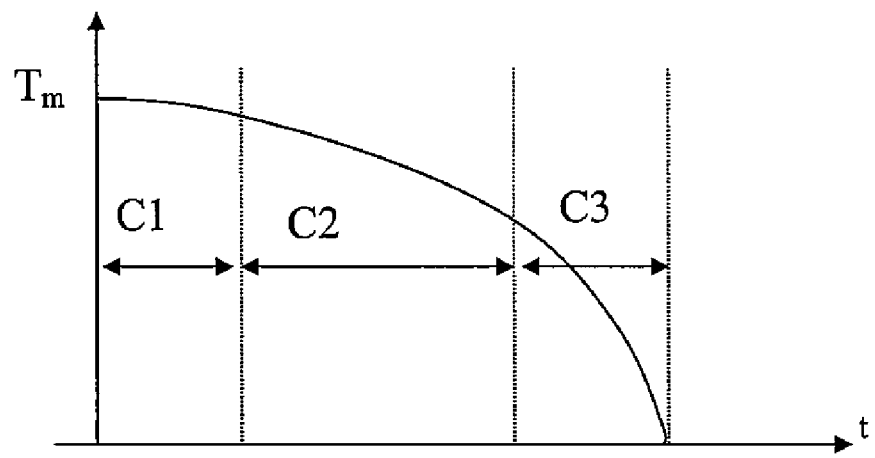
FIG. 4C shows another simplified torque curve according to an embodiment of the invention.

FIGS. 4A-C shows simplified torque curves illustrating the case when the softstarter of the invention is used for stopping of a motor. However, it should be emphasized that these curves are just examples and the softstarter according to the invention may alternatively be used for start-up.

FIG. 4A shows a simplified torque curve according to prior art, where the reduction in the reference torque $T_m$ is linear during the stopping time interval (t1–tN).

FIG. 4B shows a simplified torque curve according to an embodiment of the invention, illustrating a method for controlling an electric motor by means of the softstarter described above. The torque curve shows a desired torque, a reference torque $T_m$. The method comprises:

determining an electromagnetic motor torque $T_{12}$ of said motor in motion, calculating a difference between said determined electromagnetic motor torque and a reference torque value $T_m$ for said electromagnetic torque, calculating an error signal Err from the calculated difference between said determined motor torque and the reference torque value to change the speed of said motor, controlling the motor torque ($T_{12}$), in dependence of said torque error signal, so that the motor torque ($T_{12}$) displays a rate of change with respect to time, during a stopping time interval, that is adapted to follow a rate of change of the reference torque value ($T_M$), with respect to time, that varies between at least a first part of the time interval and a second part of the time interval, and thereby changing the speed of said motor.

Furthermore, the method comprises calculating the rate of change of the motor torque based on measurement of the input voltage (u) supplied to the motor (1,20,50), and according to the method, the measurement of the voltage supplied to the motor is made before the softstarter.

The method further comprises changing the motor (1,20) speed by controlling the rate of change of the motor torque in the first part B1 of the stopping time interval to be less than in the second part B2 of the stopping time interval so that the stopping ramp has a soft shape in the beginning of the stopping process and is steeper in the middle of the process. In this embodiment the rate of the reduction of motor torque varies during the stopping time interval (t1–tN). In another embodiment the reduction of motor speed by controlling the rate of change of the motor torque varies so that the reduction is less at the end (tN) in the last part B3 of the stopping time interval (t1–tN) and at the beginning (t1) in the first part B1 of the stopping time interval in comparison to the middle part, in this case the second part B2 of the stopping time interval. Further in this embodiment the rate of the change of the motor torque may be linear during a part B2 of the stopping time interval (t1–tN).

In another embodiment the method comprises reducing the motor speed by controlling the rate of change of the motor torque in the first part of the stopping time interval to be less than in the second part of the stopping time interval. This stopping time interval is suitable for instance when stopping a motor working as a pump. The fluid flow in pump system for fluids is often proportional to the square of the speed of the motor. The torque stop ramp reduces the fluid flow in the system very slowly in the beginning and then gradually increases the deceleration. In one embodiment the absolute value of the derivate in any point of the ramp is gradually increasing.

In another embodiment of the method the motor has an inside-delta connection to the supplied voltage and the input voltage measurement is made from an inline position inside the inside-delta connection to the motor.

In another embodiment of the method the motor is connected in line with the supplied voltage and the measurement of the voltage supplied to the motor is made before the softstarter.

In another embodiment of the method the motor is connected in line with the supplied voltage and the measurement of the voltage supplied to the motor is made between the motor and the softstarter.

The motor torque is calculated in dependence of said measured voltage. The power losses of the motor are calculated based on the nominal current for the motor.

In another embodiment of the method shown in FIG. 4C the stopping ramp has a soft shape in the beginning of the stopping process and is steeper in the middle of the process. FIG. 4C shows a simplified torque curve. The method comprises reducing the rate of change of motor speed by reducing the motor torque in the first part C1 of the stopping time interval less than in the second part C2 of the stopping time interval. In this embodiment the rate of the reduction of motor torque varies during the stopping time interval (t1–tN). The rate of the reduction of motor speed by reducing the motor torque varies so that the reduction is greater at the end (tN) in the last part C3 of the stopping time interval (t1–tN) than at the beginning (t1) in the first part C1 and the second part C2 of the stopping time interval.

A typical stopping time interval for the stopping process may be about 10 seconds using a softstarter in the voltage range of 200-700 Volts. Although for some motors and particular loads the stopping process may vary between 3-120 seconds.

It is also noted that while the above describes exemplifying embodiments of the invention, there are several variations and modifications which may be made to the disclosed solution without departing from the scope of the present invention as defined in the appended claims. For example the current and voltage controlled by the softstarter can be measured in only one or two phases. Further protection against overheating of the semiconductor components may be necessary as well as other types of overload protection. In summary, there usually are a large number of factors or parameters that may be configured or selected in order to be able to use a softstarter. The motor data may be chosen empiric or automatic.

The control unit 56 may be produced as a plug and play device to already existing softstarters.

Figure 5:
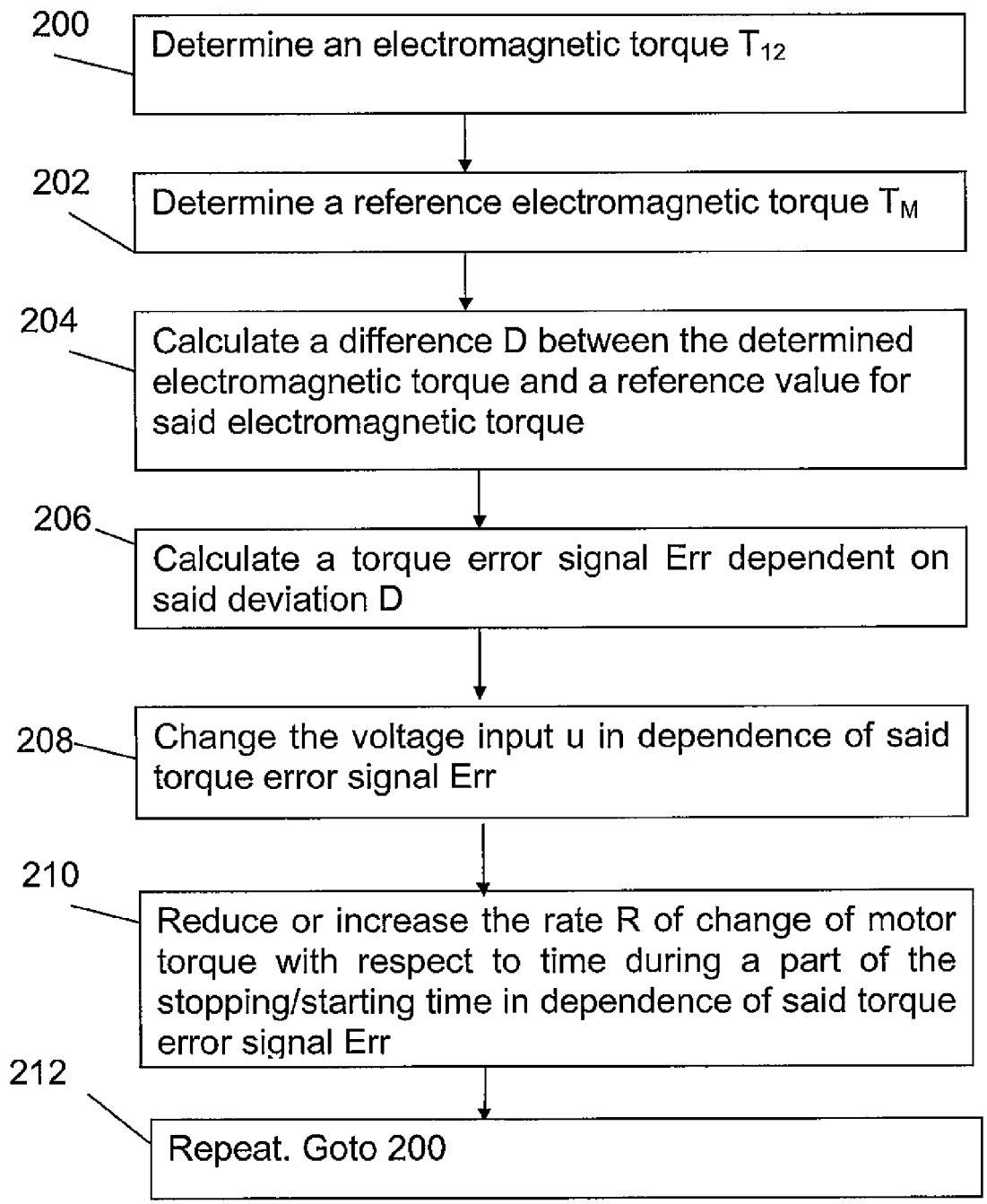
FIG. 5 shows a flow chart illustrating an embodiment of the invention for controlling a motor by means of a softstarter device.

The invention also concerns computer program directly loadable into the internal memory of a computer, which comprises program code for controlling the steps of the method. FIG. 5 shows a flow diagram for an embodiment of such a computer program, illustrating another embodiment of the invention for controlling a motor by means of a softstarter. The method is thereby using the following software steps:

Determine an electromagnetic torque $T_{12}$ (200).

Determine a reference electromagnetic torque $T_m$ (202).

Calculate a difference D between the determined electromagnetic torque and a reference value for said electromagnetic torque (204).

Calculate a torque error signal Err dependent on said deviation D (206).

Change the voltage input u in dependence of said torque error signal Err (208).

Reduce or increase the rate R of change of motor torque with respect to time during a part of the stopping/starting time in dependence of said torque error signal Err (210).

Repeat. Goto 200 (212).

The invention also concerns a computer readable medium having a computer program recorded thereon, in which said computer program is designed to make a computer control the steps of the method.

The method according to the present invention may be implemented as software, hardware, or a combination thereof.

The logic unit or computing unit comprises a microprocessor, or processors comprising a central processing unit (CPU) or a field-programmable gate array (FPGA) or any a semiconductor device containing programmable logic components and programmable interconnects performing the steps of the method according to an aspect of the invention. This is performed with the aid of one or more computer programs, which are stored at least in part in memory accessible by the processor. The computer programs may also be run on one or more general-purpose industrial microprocessors or computers instead of a specially adapted computer.

The software includes computer program code elements or software code portions that make the computer perform the method using at least one of the steps previously described in relation to FIGS. 4B, 4C and 5. A part of the program may be stored in a processor as above, but the program may also be stored in whole or part, on, or in, one or more suitable computer readable media or data storage means such as a magnetic disk, CD-ROM or DVD disk, hard disk, magneto-optical memory storage means, in ROM, RAM, PROM, EPROM or EEPROM chip or similar memory means or volatile memory, in ROM or flash memory, as firmware, or on a data server. Removable memory media such as removable hard drives, bubble memory device, flash memory devices and commercially available proprietary removable media such as a memory stick and memory cards for digital cameras, video cameras and the like may also be used.

The invention claimed is:

1. A method for controlling an electric motor with a softstarter device, the method comprising:
    determining an electromagnetic motor torque of said motor in motion,
    calculating a difference between said determined electromagnetic motor torque and a reference torque value for said electromagnetic motor torque,
    calculating a torque error signal from the calculated difference between said determined motor torque and the reference torque value,
    controlling the motor torque in dependence of said torque error signal, so that the motor torque has a rate of change with respect to time, during a stopping or starting time interval, that is adapted to follow a rate of change of the reference torque value, wherein the rate of change of the reference torque value varies between at least a first part of the time interval and a second part of the time interval, thereby changing the speed of said motor,
    calculating the rate of change of the motor torque based on a measurement of an input voltage supplied to the motor, and
    taking the measurement of the input voltage supplied to the electric motor from an inline position before the softstarter device.

2. The method according to claim 1, further comprising:
    controlling the rate of change of the motor torque in the first part of a stopping/starting time interval to be less than in the second part of the stopping time interval.

3. The method according to claim 1, further comprising:
    controlling the rate of change of the motor torque so that the rate of change of the motor torque is greater at an end of a stopping/starting time interval than at a beginning of the stopping/starting time interval.

4. The method according to claim 1, further comprising:
    controlling the rate of change of the motor torque so that the rate of change is less at an end of a stopping/starting time interval and at a beginning of the stopping/starting time interval in comparison to the middle part of the stopping/starting time interval.

5. The method according to claim 1, further comprising:
    controlling the rate of change of the motor torque so that it is linear during a part of the stopping/starting time interval.

6. The method according to claim 1, further comprising:
    measuring the input voltage supplied to the electric motor when the softstarter and the motor is in a position inside an inside-delta connection.

7. The method according to claim 1, wherein the measurement of the input voltage supplied to the electric motor is also made at a point between the motor and the softstarter device.

8. The method according to claim 1, wherein the input voltage is measured in at least one phase.

9. The method according to claim 1, wherein the power loss of the electric motor is calculated based on a nominal current supplied to the motor.

10. A softstarter device adapted for controlling an electric motor connected to the device, said softstarter device comprising:
    determining means for determining an electromagnetic motor torque of the motor,
    a difference calculator configured to calculate a difference between the determined electromagnetic motor torque and a reference torque value for said electromagnetic motor torque,
    an error calculator configured to calculate an error signal from the difference between said determined motor torque and the reference torque value,
    a regulator configured to control the motor torque, in dependence of said torque error signal, so that the motor torque has a rate of change with respect to time, during a stopping or starting time interval, that is adapted to follow a rate of change of the reference torque value, wherein the rate of change of the reference torque value varies between at least a first part of the time interval and a second part of the time interval, and thereby changing the speed of said motor, and
    a voltage measurer configured to measure the input voltage supplied to the motor, wherein the voltage measurer is arranged to measure the voltage at a point before the softstarter device and the motor, and wherein the determining means for determining the electromagnetic torque of the motor are arranged to use said input voltage.

11. The softstarter device for controlling an electric motor according to claim 10, wherein said regulator for reducing the speed of said motor by changing the motor torque comprises a control configured to control the rate of change of the motor torque in the first part of the stopping/starting time interval to be less than in the second part of the stopping/starting time interval.

12. The softstarter device for controlling an electric motor according to claim 10, wherein said regulator configured to control the motor torque, regulates the motor torque so that the rate of change of the motor torque is greater at the end of the stopping/starting time interval than at the beginning of the stopping/starting time interval.

13. The softstarter device for controlling an electric motor according to claim 10, wherein said regulator configured to control the motor torque regulates the motor torque so that the rate of change of the motor torque is less at the end of the stopping/starting time interval and at the beginning of the stopping/starting time interval in comparison to the middle part of the stopping/starting time interval.

14. The softstarter device for controlling an electric motor according to claim 10, wherein said regulator configured to control the motor torque regulates the rate of change of the motor torque so that it is linear during a part of the stopping/starting time interval.

15. The softstarter device for controlling an electric motor according to claim 10, wherein the input voltage measurer is arranged to measure the input voltage from an inside position arranged in the inside-delta connection to the motor.

16. The softstarter device for controlling an electric motor according to claim 10, wherein the voltage measurer configured to measure the input voltage is arranged to measure said voltage at a point between the motor and the softstarter.

17. The softstarter device according to claim 10, wherein the voltage measurer configured to measure input voltage is/are arranged for measuring a voltage in at least one phase.

18. A system, comprising:
an electric motor,
a device driven by the motor, and
a softstarter device for controlling the electric motor, the softstarter device comprising determining means for determining an electromagnetic motor torque of the motor, a difference calculator configured to calculate a difference between the determined electromagnetic motor torque and a reference torque value for said electromagnetic motor torque, an error calculator configured to calculate an error signal from the difference between said determined motor torque and the reference torque value, a regulator configured to control the motor torque, in dependence of said torque error signal, so that the motor torque has a rate of change with respect to time, during a stopping or starting time interval, that is adapted to follow a rate of change of the reference torque value, wherein the rate of change of the reference torque value varies between at least a first part of the time interval and a second part of the time interval, and thereby changing the speed of said motor, a voltage measurer configured to measure the input voltage supplied to the motor, wherein the voltage measurer is arranged to measure the voltage at a point before the softstarter device and the motor, and wherein the determining means for determining the electromagnetic torque of the motor are arranged to use said input voltage.

19. The system according to claim 18, wherein the electric motor and the softstarter device has an inside-delta connection to the supplied voltage.

20. A computer program product, comprising:
a non-transitory computer readable medium; and
computer program instructions recorded on the computer readable medium and executable by a processor for controlling a computer to carry out a method for controlling an electric motor with a softstarter device, the method comprising determining an electromagnetic motor torque of said motor in motion, calculating a difference between said determined electromagnetic motor torque and a reference torque value for said electromagnetic motor torque, calculating a torque error signal from the calculated difference between said determined motor torque and the reference torque value, controlling the motor torque in dependence of said torque error signal, so that the motor torque has a rate of change with respect to time, during a stopping or starting time interval, that is adapted to follow a rate of change of the reference torque value, wherein the rate of change of the reference torque value varies between at least a first part of the time interval and a second part of the time interval, thereby changing the speed of said motor, calculating the rate of change of the motor torque based on a measurement of an input voltage supplied to the motor, and taking the measurement of the input voltage supplied to the electric motor from an inline position before the softstarter device.

* * * * *